United States Patent [19]
Warner

[11] Patent Number: 4,784,512
[45] Date of Patent: Nov. 15, 1988

[54] STEERING LINKAGE ARM ASSEMBLIES

[75] Inventor: Vernon C. Warner, St Marys, Ohio

[73] Assignee: The Goodyear Tire & Rubber Company, Akron, Ohio

[21] Appl. No.: 796,816

[22] Filed: Nov. 12, 1985

[51] Int. Cl.$^4$ ............................................. F16D 1/00
[52] U.S. Cl. ................................. 403/225; 403/228; 305/58 R
[58] Field of Search ...................... 403/225, 226, 228; 305/58 R, 41, 42

[56] References Cited

U.S. PATENT DOCUMENTS

| | | | |
|---|---|---|---|
| 2,774,620 | 12/1956 | Thiry et al. | 403/228 |
| 4,175,798 | 11/1979 | Korner et al. | 305/58 R |
| 4,235,558 | 11/1980 | Snyder et al. | 403/137 X |
| 4,643,608 | 2/1987 | Warner | 403/225 |

FOREIGN PATENT DOCUMENTS 3005002  9/1980  Fed. Rep. of Germany ........ 305/43

*Primary Examiner*—Andrew V. Kundrat
*Attorney, Agent, or Firm*—J. D. Wolfe; M. R. Dion, Sr.

[57] ABSTRACT

A pivotal joint assembly including a socket housing having a cavity essentially of the shape of the bearing end of the stud member to receive the bearing member in operative relationship, said bearing member of said stud member being essentially cylindrical in shape and at least covered with sufficient elastomer to form a head and shoulder appearing elastomer ring thereon and to cause the elastomer in the head portion to be compressed 25 to 35% and preferably 27 to 32% in the assembled state. In a special embodiment, the pivotal joint assembly is adapted for use on track laying vehicles, such as tank tracks to give a housing to receive an inner pin or sleeve member having one or multiple bushings molded thereto, each bushing comprising a cylindrically elastomeric unit having a diameter larger than the diameter of the housing opening to receive the rubber and metal sleeve member and having a cylindrically elastomeric part of lesser diameter molded at each end of said larger cylindrical elastomeric unit to give said rubber and metal sleeve member the appearance of having one or multiple head and shoulder elastomeric units spaced thereon.

4 Claims, 2 Drawing Sheets

STEERING LINKAGE ARM ASSEMBLIES

BACKGROUND OF THE INVENTION

The present invention relates to pivotal joint assemblies and is more particularly directed to what is broadly and generally called ball and socket type joints as commonly used in steering linkage arms, power steering systems, front-end suspension systems and the like. More particularly, this invention relates to an improved pivotal joint assembly utilizing in one embodiment a metallic cylindrical bearing member having a relatively large elastomeric ring adhered thereto with smaller rings juxtapositioned at each end of the large ring and adhered to said metallic bearing member.

In the special embodiment for use on track laying and related equipment, the housing has an opening to receive operatively therein a pin or sleeve member having one or multiple cylindrical elastomeric units having a diameter larger than than the diameter of the opening in the housing and positioned at each end of each said elastomeric unit a cylindrical elastomeric mass to give the sleeve member a single or multiple head and shoulder appearance.

PRIOR ART

A great many different types of ball and socket joints have been utilized to interconnect various moving elements in vehicles. Typically, these ball and socket joints have used synthetic resins which are mechanically locked between the ball and the socket to provide a sliding surface construction. This sliding surface construction is quite susceptible to dirt, salt and other forms of contamination that reduce the life of the joints. The contaminants can work their way between the resins and the ball and/or socket. Additionally, the mechanical lock and corresponding sliding surface construction is subject to ball pullout from the socket, especially in high angular loading applications. An additional problem is that the stress buildup is not uniform.

Elastomeric type ball joints are well known and have been used in a number of commercial operations. For instance, the ball joint design of U.S. Pat. No. 4,235,558 has been used on the very light trucks, but for the heavier trucks and vans such as the F and E lines of The Ford Motor Company, the prior art elastomeric joints were not successful in the most highly stressed position without redesigning the socket and other components.

Another specie of the elastomeric type ball or cylindrical joints that has been used is one or a plurality of rubber bushing elements disposed upon a single sleeve or pin such as for instance in tank track bushings. Although these tank bushing units are vulcanized or bonded to the single sleeve they have tended to fail due to the elastomer developing fatigue cracks in the elastomer a short distance displaced from the outer surface of the pin or sleeve member and splitting away as a ring to leave a thinner ring of elastomer adhered to the sleeve. U.S. Pat. No. 2,774,620, Thiry et al, proposes a theory as to why these bushings vulcanized to the sleeve fail and suggests the use of a unit having a free non-adhered rubber bushing element fitted on a sleeve, that in turn fits inside an outer housing member. The Thiry et al patent does not disclose or teach how to prevent the failure of the elastomeric bushing vulcanized or bonded to the sleeve but instead uses a metal sleeve having a free moving rubber bearing thereon.

BRIEF SUMMARY OF THE INVENTION

In accordance with the present invention, there is provided a pivotal joint assembly for use in motor vehicle suspension steering linkages or the like. The assembly includes a bearing-stud member with a bearing portion preferably in the shape of a cylinder instead of the more standard ball and a shank portion and an open-ended socket member into which the bearing member portion of the stud is inserted. A continuous elastomeric covering is bonded to the bearing portion, preferably to cover the entire surface of the bearing portion and extend up onto the shank and is of sufficient thickness to provide a resilient interconnective operative relationship between the socket member and the stud member. The elastomeric cover in one sense can be viewed as a relatively thick ring extending over at least one-half to three-fourths the length of the cylindrical portion with relatively thinner rings at each end of the large ring and having a thickness relative to the thickness of the large ring of one-fifth to two-fifths that of the larger ring. The relative thickness of the large and smaller rings are measured from the outside of the metal cylinder to the outside of each elastomeric ring. The elastomeric material of the bearing portion of the shank member is deformed for insertion into the open end of the socket to thereby resiliently interconnect the socket and the stud. The elastomer of the larger ring is compressed about 25 to 35% and preferably 27 to 32% while in the socket. A pivotal joint assembly thus is provided that is capable of giving greater life under radial, angular and axial loadings than presently known elastomeric resiliently interconnected studs and sockets.

Although the elastomeric member has been described as a larger ring having a smaller elastomeric ring at each end thereof to give a head and shoulders appearance, it should be appreciated that in actual practice the elastomeric unit will usually be molded as a single integral unit.

When the special embodiment for use on track laying vehicles is used, the plurality of head and shoulder appearing elastomeric bearing units will be molded on the drive pin or sleeve in a spaced apart manner as shown in FIG. 3 or as a single unit.

Other advantages and objects of this invention will become apparent hereinafter when the following specification is read in conjunction with the accompanying drawings.

DESCRIPTION OF PREFERRED EMBODIMENTS

In view of its use in this specification and in the claims that follow, it should be explained that by the word "elastomer" is meant any rubber-like polymeric material, and the words "rubber" or "rubber like" may hereinafter be used as equivalents. The term "elastomer" is a general descriptive word for rubber-like, polymeric materials and is sometimes considered as an abbreviation for elastopolymer and elastic polymer. As herein used, it may be understood to cover the high molecular elastic colloid, natural caoutchouc, synthetic rubber, synthetic natural rubber, as well as the rubber-like materials such as neoprene, butyl rubber, the styrene-butadiene copolymer and EPDM rubbers.

Figure 1:
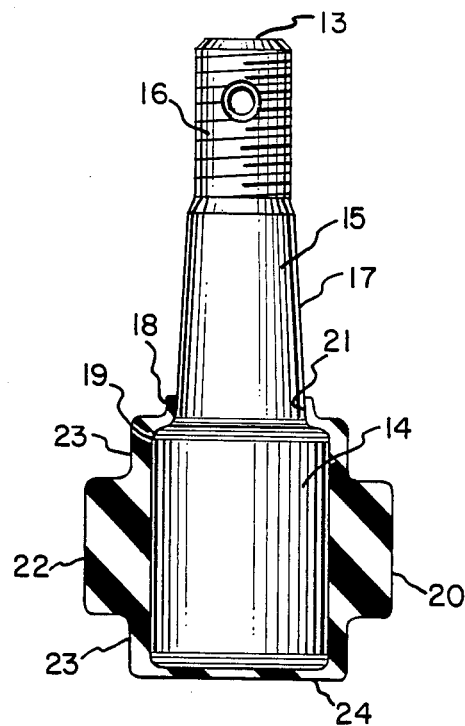
FIG. 1 is a cross-sectional view of the cylindrical bearing joint stud of this invention with the elastomer layer bonded thereto to give a cover having the appearance of a relatively thick-wide ring with a relatively thin-narrow ring at each end of the thick-wide ring which may be molded as an integral covering to give the desired head and shoulder appearance.
Figure 2:
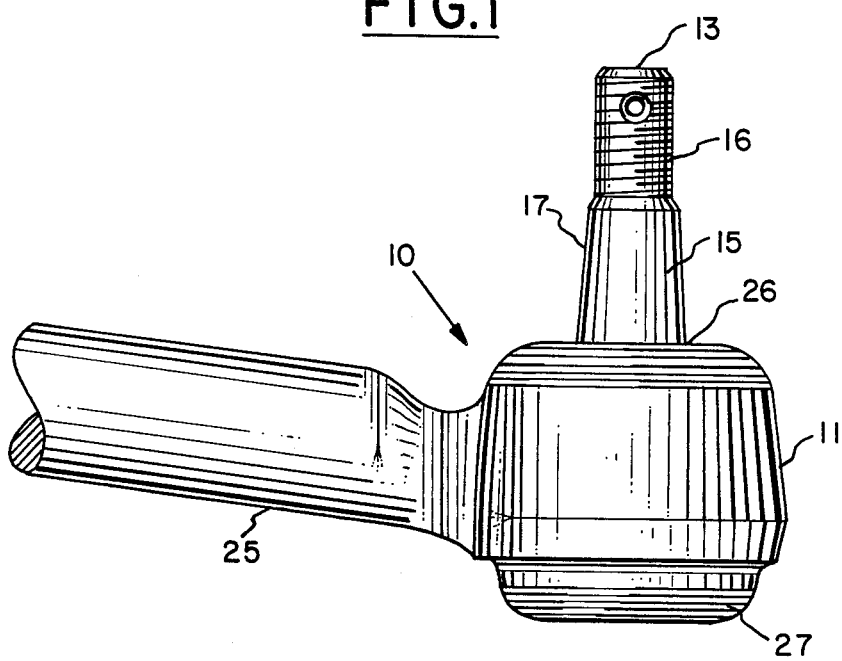
FIG. 2 is a side view of the stud and socket joint of this invention integrally formed with a tie rod end.

In the "ball" stud and socket arrangement which is shown in FIGS. 1 and 2, numeral 10 designates a stud-socket joint with an open ended socket portion 11 and a "ball" stud portion 13. The cylindrical stud portion 13, typically made from metal such as steel and related ball stud metals, has a generally cylindrical bearing member 14 with preferably a tapered shank portion 15 depending therefrom. Shank portion 15 has a threaded distal end portion 16 and a tapered portion 17 which terminates at an underside portion 18 of the preferably rounded or tapered end 19 of the cylindrical bearing member 14.

Although the invention is described in this embodiment it could be used with adaptation with the more conventional ball configuration or with a single or plurality of elastomeric units molded or vulcanized on the pin or sleeve portion of a tank bearing or related vehicle.

Secured to a portion of the cylindrical bearing member 14 is an elastomer coating layer 20 which is attached to the surface by bonding or other appropriate adhesion as is known in the art. More particularly, elastomer coating layer 20 is permanently chemically bonded to cylinder 14 and also preferably the top portion of tapered shank portion 21 adjacent the tapered cylindrical portion 19. The elastomer coating in cross-section as shown in FIG. 1 has a head and shoulder appearance where the head is a relatively thick-wide elastomeric ring 22 with two relatively thin elastomeric rings 23 at each end of the relatively thick-wide elastomeric ring 22 appearing as the shoulders.

The cylindrical stud thus described is adapted for assembly within the cavity of the open ended socket or housing 11 having a threaded arm 25. Generally the cylindrical cavity of the housing 11 is only slightly larger than the cylinder portion 14 of the stud so that when the elastomer coated layer on the stud is compressed about 25 to 35% and preferably 27 to 32% in the assembled position as shown in FIG. 2, it will be in an operative relationship and the stud cavity will normally be about 95 to 105% filled on a volume basis. When the head and shoulders shaped elastomer coated cylinder stud of FIG. 1 is assembled within the cavity of the the open-ended socket 11, a suitable lubricant such as the well known light weight paraffinic-napthenic oil is put on the elastomer to aid in forcing the stud into the socket cavity. The elastomer in the compressed state, preferably 27 to 32% compressed, fills the cavity of the socket.

Usually a V-shape jig (not shown but well known to the art) is used to achieve the compression of the elastomer as the stud moves downward under force through the cavity of the jig to insert the stud in the cavity of the socket in the assembled condition. With the elastomer covered stud inserted into the cavity of the socket, the well-known coining mandrel (not shown) then is used initially to deform the lower end portion 27 of the socket, inwardly, partially closing the open end of the socket. A window 26 is provided to facilitate the movement of the shank. This window, of course, obviously will have a diameter or width less than the diameter of the cylinder 14, but sufficient for movement of the shank.

The cylindrical stud of FIG. 1 is provided with preferably a single piece coating of elastomer, preferably a sulfur curable carbon black natural rubber, chemically bonded to the metal of the stud portion. This chemical bond provides a strong elastomer-to-metal adhesion between the elastomer and the metal of the stud. The adhesive which provides for rubber-to-metal adhesion is preferably curable through heat treatment thereby providing a completely bonded system capable of accepting very substantial stud angular movement without slippage or pull out. A typical rubber-to-metal adhesive or elastomer bonding agent is a heat reactive elastomer base adhesive such as the Chemlok TM series adhesives, such as 234-B, produced by the Hughson Chemicals, Lord Corporation. It is preferred that a standard commercial metal primer be used prior to applying the adhesive as is known in the art.

It is amazing to discover that the use of an elastomer resilient member having a head and shoulder appearance provides a stud member that can withstand 13,000–20,000 cycles at a 2100 pound radial load where the stud member rotates at 30 cycles per minute through a plus and minus 40° turn. Also, this head and shoulder shaped resilient member reduces the tendency of the elastomer to disintegrate about an eighth to a quarter of an inch (0.317 to 0.636 cm.) from the metal cylinder of the stud. Use of elastomer of 65–70 Durometer hardness is particularly preferred where the cavity of the socket is 95 to 105% filled relative to the volume of the large and small elastomer rings, and including the main cylindrical metal part of the stud.

Figure 3:
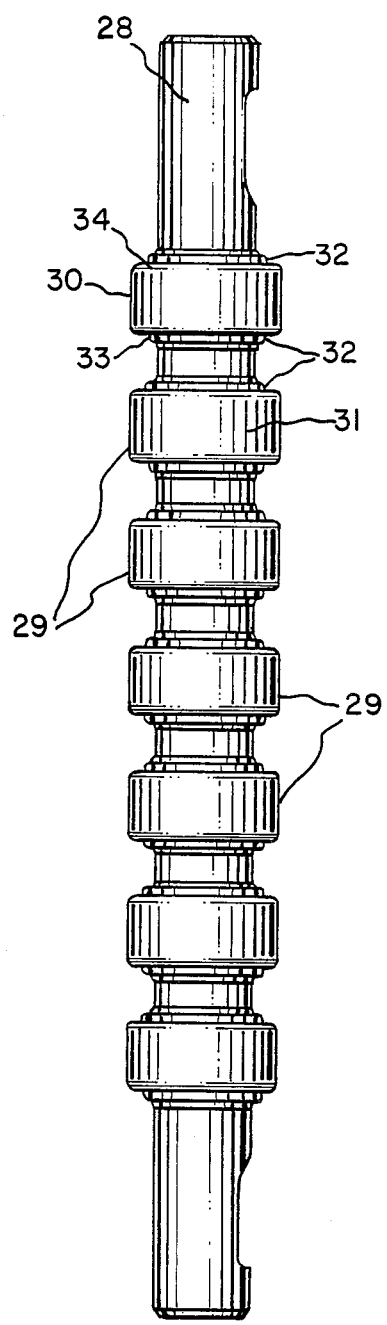
FIG. 3 is a side view of a specific embodiment of a cylindrical molded bearing joint sleeve or pin having a plurality of spaced elastomeric rings thereon with a relatively broad thick ring having a relatively thin narrow ring at each end of the relatively broad thick ring.

Referring to FIG. 3 the bearing pin 28 is shown with a series 29 of individual elastomeric elements 30 composed of a relatively thick wide elastomeric band 31 having a relatively thin narrow elastomeric ring 32 at each end 33 and 34 respectively of said band 31. These head and shoulder bonded elastomeric members bonded in spaced relation (usually about 1 to 2.5 centimeters or more) on the pin or sleeve give improved service life and have a much reduced tendency of the elastomer to disintegrate a short distance away from the surface of the sleeve or pin. Thus, this embodiment gives much improved track bearing life.

While certain representative embodiments and details have been shown for the purpose of illustrating the invention, it will be apparent to those skilled in this art that various changes and modifications may be made therein without departing from the scope of the invention.

What is claimed is:

1. A pivotal drive pin or sleeve for the bearings of joint assembly mechanisms connecting the multiple units of track on track laying vehicles including a metallic pin or sleeve having at least one elastomeric bearing member bonded to said pin or sleeve, said elastomeric bearing member having a head and shoulder appearance with a larger diameter cylindrical portion of elastomer having a smaller diameter cylindrical portion at each end of the larger portion.

2. The pivotal drive pin or sleeve of claim 1 where the thickness of the elastomer of the smaller cylindrical portion is one-fifth to two-fifths the thickness of the elastomer of the larger diameter portion.

3. The pivotal drive of claim 1 wherein a plurality of elastomeric units are is spaced about 1 to 2.5 centimeters or more from each other.

4. The pivotal drive of claim 1 wherein a plurality of elastomeric units are spaced at least 0.5 centimeters from each other.

* * * * *